J. A. JONES.
VEHICLE SPRING.
APPLICATION FILED JULY 22, 1918.
1,292,331. Patented Jan. 21, 1919.
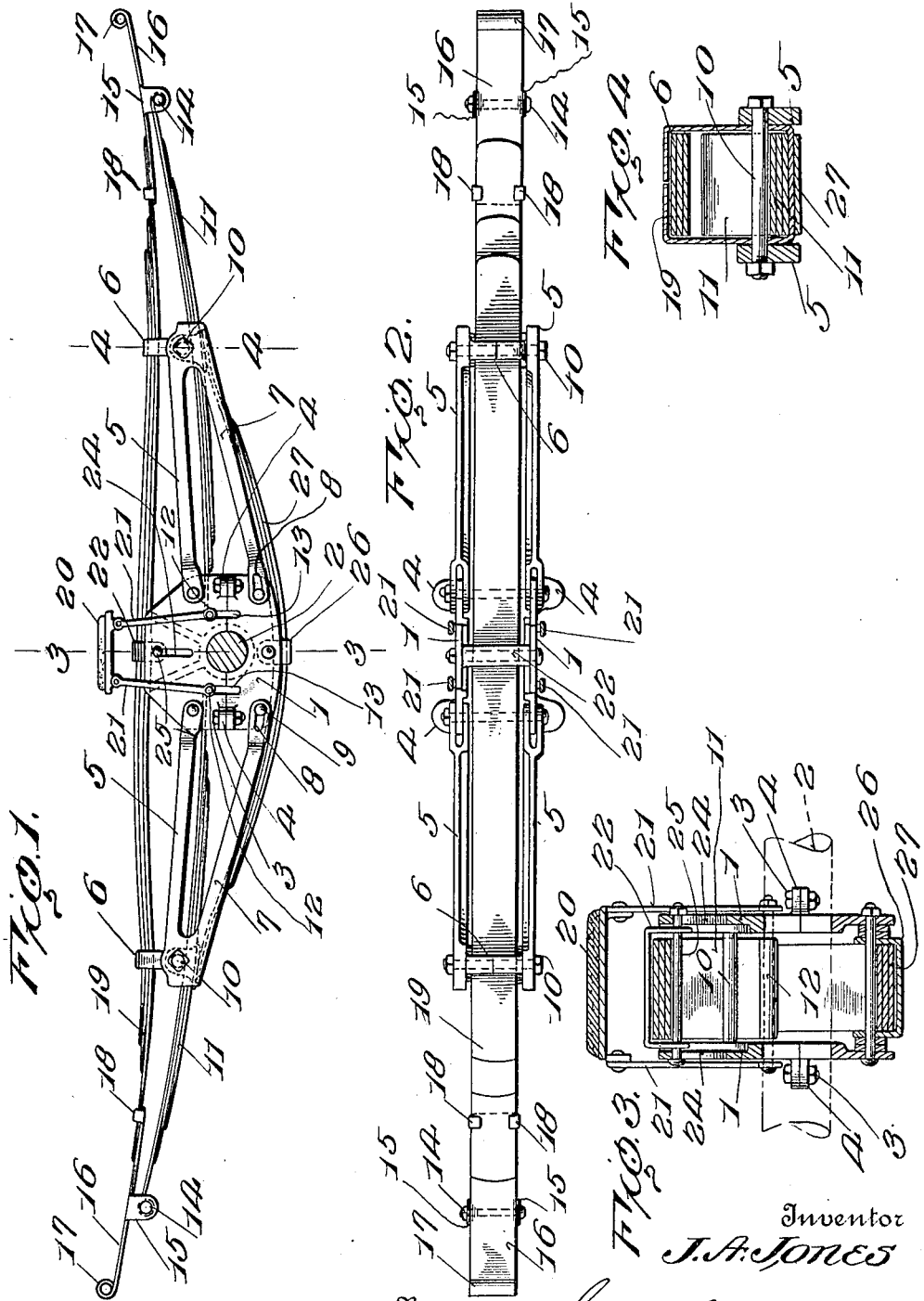
Inventor
J. A. JONES
By
Lacey & Lacey, Attorneys

UNITED STATES PATENT OFFICE.

JAMES ANDREW JONES, OF JACKSON, TENNESSEE.

VEHICLE-SPRING.

1,292,331.  Specification of Letters Patent.  Patented Jan. 21, 1919.

Application filed July 22, 1918. Serial No. 246,124.

*To all whom it may concern:*

Be it known that I, JAMES A. JONES, citizen of the United States, residing at Jackson, in the county of Madison and State of Tennessee, have invented certain new and useful Improvements in Vehicle-Springs, of which the following is a specification.

My invention relates to vehicle springs and seeks to provide a mechanism whereby a vehicle will be enabled to ride over rough roads without imparting shocks and jars to the occupants.

The invention is illustrated in the accompanying drawings and consists in certain novel features which will be hereinafter first fully described and then more particularly pointed out in the appended claims.

In the drawings—

Figure 1 is a side elevation of a vehicle spring embodying my invention;

Fig. 2 is a plan view of the same with the bumper removed;

Fig. 3 is a transverse section on the line 3—3 of Fig. 1;

Fig. 4 is a detail transverse section on the line 4—4 of Fig. 1.

In carrying out my invention, I employ side plates 1 which are preferably constructed each in two members secured together about the axle 2 by bolts 3 inserted through registering lugs 4 on the meeting edges of the said sections or members. To each side plate, above the axle and at each edge of said side plate, I pivotally attach one end of a triangular lever or supporting arm 5 which carries a guide loop 6 at its outer end and from the said outer end of the lever a lower arm or member thereof, as shown at 7, extends downwardly to the side plate and has a pin and slot connection with the same, a longitudinal slot 8 being formed in the extremity of the said lower branch or arm of the lever to engage over a pin or stud 9 on the side plate. The loop 6 is held between the outer ends of the parallel levers 5 by a bolt 10 inserted transversely through the said ends of the levers, and a semi-elliptical spring 11 is disposed longitudinally between the said levers with its central portion disposed against and below the said bolt, it being noted, more particularly upon reference to Fig. 4, that the loop depends below the pin so as to support said spring. The inner end of this spring 11 is formed into an eye or sleeve fitting around a pin or bolt 12 which is mounted in vertical slots 13 in the side plates 1, while the outer end of the spring is in a like manner fitted around a bolt 14 carried by the depending lugs or ears 15 at the side edges of the outer member 16 of an upper spring. The spring section 16 has its outer extremity formed into an eye or sleeve 17 which may be and is intended to be attached to the body of the vehicle while the inner end of said spring section is provided at its edges with overhanging lugs or hooks 18 adapted to slidably engage the edges of the upper semi-elliptical spring 19 at the outer end of the same. The spring 19 passes below a bumper or platform 20 which is disposed centrally above the side plates 1 and is supported by legs 21 depending from its corners to the pins or bolts 12 and having pivotal connection with the said bolts and with the platform. A loop 22 is passed over the spring 19 at the center thereof, and has its ends disposed in proximity to slots 24 formed in the upper portions of the side plates at the center of the same, a pin 25 being inserted through the said slots and the ends of the loop to limit the vertical movement of the platform or bumper relative to the side plates. The spring 19 passes through the upper portions of the retaining loops 6 so that excessive movement of the same away from the spring 11 will be prevented and lateral vibration during the up and down movement of the same will be obviated. To the lower edges of the side plates 1, at the center thereof, I secure a loop or saddle 26 through which a bottom semi-elliptical spring 27 passes, the ends of said spring 27 bearing against the lower ends of the loops 6.

The normal tendency of the several springs is to resist downward movement and they are so arranged that while great freedom of movement is permitted they are mutually reinforced and exert a constant strong lifting force to support the vehicle body above the axle. Should the axle rise upon meeting an obstruction in the road the side plates will, of course, be carried upwardly and the inner ends of the springs 11 with the bumper or platform will tend to rise, and loop 22 may rise. The spring 16 will rock upon the bolt or pin 14 and the outer ends of the springs 11 and 19 will assume a more open relation, the bumper meeting the vehicle body which is moving relatively downwardly. The bumper, moving relatively downward with the body, will meet the central portion of the spring 19 and be thereby yieldably checked, the movement being positively arrested if it should be so great as to carry the pins 12 and 25 to the lower ends of their respective slots. The levers 5 firmly support the springs and prevent excessive downward movement of the same so that breaking of the springs will be avoided, and the movement of these levers is limited by the pins 9 and slots 8 so that excessive vibration of the vehicle body and the resultant discomfort to the occupant of the same will be avoided. The device is very simple and compact and may be readily applied to any vehicle now in use. The combination of parts is such that with comparatively light springs, the apparatus will exert a force normally equal to or somewhat in excess of the weight carried by the body when loaded to its normal capacity, the result being that the parts resume their normal position almost immediately after passing over a ridge in the road and disagreeable rebound is overcome.

Having thus described the invention, what is claimed as new is:

1. A vehicle spring comprising supporting plates to be secured to an axle, levers pivoted to and projecting forwardly and rearwardly from said supporting plates, means for limiting the vibratory movement of the levers, springs having their inner ends supported between the side plates and arranged for vertical movement and their intermediate portions guided by the outer ends of the levers, and a spring secured intermediate its ends to the side plates at the lower edges thereof and having its ends bearing against the first-mentioned springs at the outer ends of the levers.

2. In a vehicle spring, the combination of supporting plates, a bumper disposed above the side plates and supported thereon for vertical movement, springs having their inner ends disposed between the side plates and movable with the said bumper, an upper spring extending below the bumper, and slidable connections between the ends of the upper spring and the outer ends of the first-mentioned springs.

3. In a vehicle spring, the combination of supporting plates, a spring secured intermediate its ends to the lower edges of said plates, intermediate springs having their inner ends disposed between the supporting plates and arranged for limited vertical movement relative thereto, the intermediate portions of said intermediate springs bearing upon the ends of the first-mentioned springs, an upper spring disposed above the side plates, and movable connections between the ends of said upper spring and the outer ends of the intermediate springs.

4. A vehicle spring comprising supporting plates, a lower spring secured intermediate its ends to the lower edges of said plates, levers pivoted to said plates and extending rearwardly and forwardly therefrom, means for limiting the pivotal movement of said levers, pins carried by the outer ends of the levers, intermediate springs having their inner ends disposed between the side plates and arranged for limited vertical movement relative to the plates and their intermediate portions passing between the levers and under the pins at the outer ends of the same, the outer ends of the first-mentioned spring bearing against the intermediate portions of the said intermediate springs at the said pins, a top spring, and connections between the outer ends of said top spring and the outer ends of the intermediate springs.

5. A vehicle spring comprising supporting plates to be secured to an axle, levers pivoted to the said side plates and extending therefrom, said levers being disposed in pairs and having upper arms pivoted to the side plates and lower arms having pin and slot connection therewith, pins inserted through the outer ends of the levers of each pair, loops carried by said pins, a bumper disposed above the side plates, legs pivoted to and depending from said bumper and having their lower ends connected with the side plates for limited vertical movement, a loop secured to and depending from the side plates at the lower edges thereof, a spring supported by said loop and having its ends disposed below the pins at the outer ends of the levers, intermediate springs having their inner ends connected with the legs depending from the bumper and their intermediate portions passing between the free ends of the first-mentioned spring and the pins immediately above the same, spring sections pivotally connected to the outer ends of the said intermediate springs, a top spring passing below the bumper and between the legs depending therefrom and through the loops at the outer ends of the levers, and slidable connections between the ends of said top spring and the inner ends of the spring sections carried by the intermediate springs.

6. A vehicle spring comprising a support, a bottom spring secured between its ends to the support, intermediate springs disposed at the sides of the support and resting between their ends on the ends of the bottom spring, the inner ends of said intermediate springs being slidably connected with the support, and a top spring extending over the support and connected near its ends with the outer ends of the intermediate springs.

In testimony whereof I affix my signature.

JAMES ANDREW JONES. [L. S.]

Copies of this patent may be obtained for five cents each, by addressing the "Commissioner of Patents, Washington, D. C."